April 14, 1970  K. RODER ET AL  3,506,234
VERTICALLY ADJUSTABLE COLUMN, PARTICULARLY FOR SWIVEL CHAIRS
Filed Jan. 31, 1967  2 Sheets-Sheet 1

Inventors:
KURT RODER, ALBERT ZANDER
BY Otto John Munz
ATTORNEY

3,506,234
VERTICALLY ADJUSTABLE COLUMN, PARTICULARLY FOR SWIVEL CHAIRS
Kurt Röder, Am Schofhof 39, Kronberg/Taunus, Germany, and Albert Zander, Waldstrasse 27, Bergen-Enkheim, Germany
Filed Jan. 31, 1967, Ser. No. 612,943
Claims priority, application Germany, Feb. 8, 1966, 1,296,760
Int. Cl. A47c 3/40; F16m 11/28
U.S. Cl. 248—412    5 Claims

ABSTRACT OF THE DISCLOSURE

In the column of a chair, a tubular mounting member, bearing the weight of seat and occupant, is provided with a conically tapered end. The faces of this tapered end ride downwards against inwardly protruding indentations on a tubular slide member. The walls of the slide member are longitudinally slotted at the indentations, thereby making the walls outwardly deflectable under the action of the tapered end of the mounting member. The walls of the slide member lock frictionally against the inner walls of a supporting member. Thus, the weight of seat and occupant is borne. A lever is provided to unwedge the tapered end from the indentations, should adjustment of the seat height be required.

---

The present invention relates to vertically adjustable columns, particularly for swivel chairs. More specifically, this invention concerns a column with telescoping tubes mounted in a case in the pedestal.

In the following, the column of the invention will be described as used in conjunction with swivel chairs, it being intended that this particular application shall be interpreted as illustrative and not in a limiting sense.

Prior-art swivel chairs with adjustable seat height employ a variety of locking mechanisms that can be expanded or compressed under the action of a built-in spring, the adjustment of the height normally being effected by means of spring elements, particularly pneumatic springs, which are activated by the actuation of a foot- or hand-lever. In all of these prior-art locking mechanisms spring pressure is required in some way or other to put the mechanism into effect.

In addition to height adjusting mechanisms employing click-stop means, mechanisms with infinitely variable height adjustment have been proposed which function also without lifting springs. A serious drawback of these adjusting devices consists, however, in that all the inside space of the tubes is occupied by the locking mechanism, thereby balking the desired application of a pneumatic spring.

A further disadvantage of the prior-art adjusting mechanisms consists in that generally they can be used only with or without lifting springs. Thus, if the pneumatic spring used for adjustment of the seat height has become defective, the chair can no longer be used at all or only with the seat in its lowermost position.

Accordingly, this invention has as its main object to provide a vertically adjustable column for swivel chairs or similar objects with height adjustment, which is well-arranged and simple in construction and which functions also without a pneumatic spring or the like and permits the installation of pneumatic or other lifting springs at a later time.

According to the invention, a vertically adjustable column, particularly for swivel chairs, comprising a sleeve-like base member with pedestals, a tubular supporting member and a tubular slide member, the tubular supporting member being resiliently supported within the sleeve-like base member, the tubular slide member having its lower end portion extended into the tubular supporting member so as to be slidable therein, the lower end portion of the tubular slide member having elongated slots and an indentation, is characterized in that a tubular mounting member of a suitable diameter is fitted into the tubular slide member in such a manner that its lower tapered end portion extends substantially into the area of indentation of the tubular slide member so as to cooperate with the indentation, the tubular mounting member being axially slidable in the tubular slide member within relatively narrow limits and containing no construction parts in its inside space, and in that a tilting lever known per se is secured to the upper end of the tubular slide member, the lever extending through an aperture in the slide member into an aperture in the tubular mounting member.

Due to its unique design the height-adjusting mechanism can be positively locked and used either with or without a lifting spring. If desired, a pneumatic or other spring can be easily inserted into the column of the invention in view of the free space provided therein. Locking of the column can be effected either with or without spring pressure, because the locking effect is produced already by the known weight of the unloaded seat and of the tilting lever, for example, and is intensified in a manner known per se, as the load on the seat increases, until the seat is safely clamped.

Further details and advantages of the invention will become apparent from the following description and the appended drawings in which several embodiments of the column of the invention are illustrated by way of example only. In the drawings.

Figure 1:
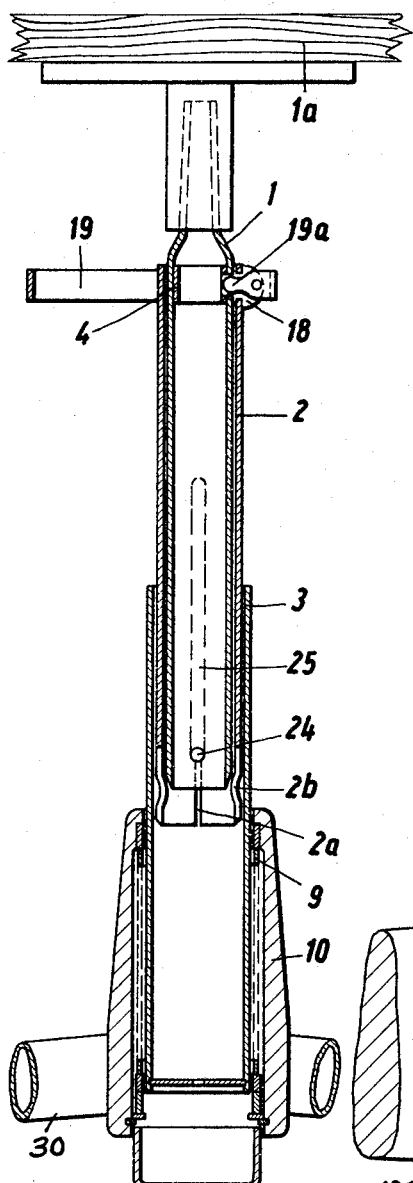
FIGURE 1 is a cross-section through one embodiment of a column of the invention without lifting spring.
Figure 2:
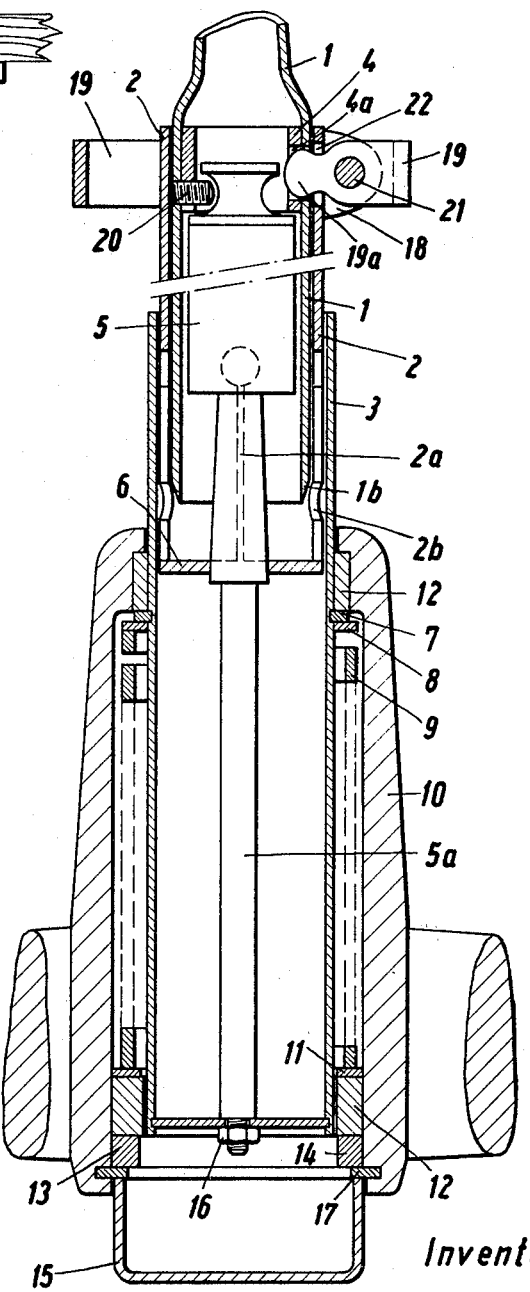
FIGURE 2 is a cross-section through another embodiment of a column of the invention with built-in pneumatic spring.

Referring now more particularly to FIGS. 1 and 2, there is shown at 1, an inner tubular mounting member which is axially slidable within relatively narrow limits in an intermediate tubular slide member 2. The upper end of mounting tube 1 serves to mount the seat 1a, and the lower end of the tube is tapered as at 1b. At its lower end slide tube 2 is, in a manner known per se, provided with a plurality of slots 2a and slightly bent outwards, thereby insuring that in this area slide tube 2 is always in slight contact with an outer tubular supporting member 3. Preferably, the upper ends of slots 2a in slide tube 2 are designed to form bores of a diameter larger than the width of the slots.

In the area of slots 2a slide tube 2 has an inwardly bent portion or indentation 2b arranged to cooperate with the lower tapered end portion 1b of mounting tube 1. Slide tube 2 with the inner mounting tube 1 fitted therein is axially slidable in the outer tubular supporting member 3, it being in slight frictional engagement with the inner surface of supporting member 3. Member 3 is rotatably and axially slidably disposed in upper and lower bearing bushings 12 of plastics material in a sleeve-like base member 10 having pedestals 30.

A retaining ring 7 in the outer supporting tube 3 is supported from a locating ring 8 which serves as an abutment for the upper end of a cushioning or buffer spring 9, whose lower end is urged downwards against a locating ring 11. The lower bearing bushing 12, a spacer 14 and a lock ring 17 serve to hold the buffer spring in place in base member 10. At its lower end, base member 10 is sealed by means of a cap 15. Upon loading of the seat the outer tubular support 3 compresses the buffer spring 9 through the agency of retaining ring 7 and locating ring 8, thereby providing a seat cushioning, as is well known.

In the upper portion of mounting tube 1 a bush-like member 4 is disposed. Member 4 and mounting tube 1 are slotted as at 4a. Similarly, slide tube 2 is slotted as at 22. A round nose 19a on a release lever 19 extends through slot 22 into slot 4a. Lever 19 is pivoted to a bearing pin 21 which extends through suitable holes in lever 19 and bearing brackets 18, the latter being secured to slide tube 2 as by welding. Slot 22 in slide tube 2 extends beyond the upper and lower ends of slot 4a in mounting tube 1 and bushing 4, so that when release lever 19 is tilted upwards mounting tube 1 is shifted slightly axially upwards relative to slide tube 2, thereby lifting off the tapered end portion 1b of mounting tube 1 from indentation 2b of slide tube 2 and thus removing the pressure exerted by the axially slotted slide tube on the inner surface of the outer supporting tube 3. In this manner the seat height can be manually adjusted.

Upon release of tilting lever 19 the lever rotates slightly downwards about pivot 21 because of its own weight, thereby causing nose 19a to rest on the lower edge of slot 4a in mounting tube 1 and moving the slide tube slightly upwards. As a result, the tapered end portion 1b of mounting tube 1 is pressed against the inwardly bent portion or indentation 2b of slide tube 2, and the split end of the slide tube is urged against the inner wall of supporting tube 3. The pressure which is then exerted by the unloaded seat on the structure increases the locking effect and, hence, the tightness of the fit of slide tube 2 in supporting tube 3 to such an extent that the unoccupied seat is maintained on the previously adjusted level. Upon loading of the seat the locking effect of the slotted slide tube 2 on supporting tube 3 still further increases. To minimize wear, slide tube 2 and the inner surface of supporting tube 3 are coated with a graphitic material, as is well known.

To make the tilting movement of lever 19 correspond to that of its nose 19a, the lever is bent beyond the bearing brackets 18 180 degrees to the other side of the column.

Figure 4:
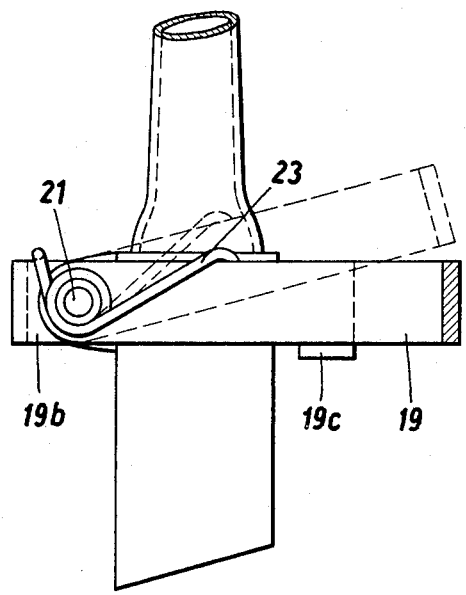
FIGURE 4 is a side elevation of the two-part tilting lever with locking spring.
Figure 5:
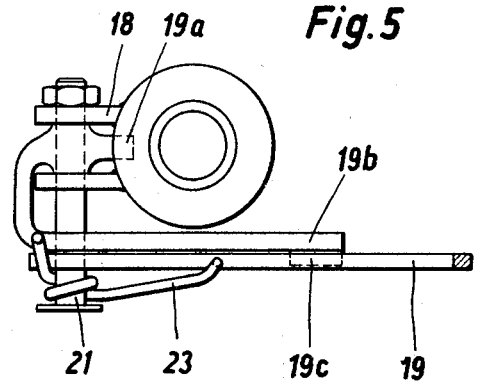
FIGURE 5 is a top plan view of the tilting lever.

To prevent the loaded seat from moving down inadvertently upon actuation of tilting lever 19, the lever comprises two separate parts, as shown in FIGS. 4 and 5. More specifically, the lever has an arm 19 and a bent lever portion 19b which is provided with nose 19a and a stop 19c. Lever arm 19 and lever portion 19b are spring-loaded with respect to each other by means of a spring element 23 which is so dimensioned with respect to buffer spring 9 that upon lifting of lever arm 19 portion 19b does not follow the movement of lever arm 19, unless the seat and, hence, locking mechanism 1b–2b is unloaded, thereby preventing the locking mechanism from being released when the chair is occupied. The same effect can be also attained with the aid of a lever 19 that is flexible at the area of its bend. Furthermore, an adjustable spring may be provided at the pivot.

As noted previously, the interior of the column of the invention remains completely free. It is, therefore, possible to mount a lifting or relieving spring inside the column, if desired. With such a spring, which may be of the conventional pneumatic type shown in FIG. 2, vertical adjustment and locking of the seat will be accomplished exactly as described before, it being no longer necessary, however, to lift the seat manually upon release of locking mechanism 1b–2b by lever 19. Rather this function will be assumed by pneumatic spring 5, whose stem 5a is secured to supporting tube 3 by means of a mounting plate 13 and a nut 16. The spring housing connects to a plate 6 and through the latter exerts a pressure on the slide tube. This pressure has no adverse effect on the locking action between slide tube 2 and supporting tube 3, yet it permits slide tube 2 with mounting tube 1 to raise seat 1a. Upon release of tilting lever 19 the seat is locked at any desired level. To lower the loaded seat, lever 19 is moved up and the seat partially unloaded, until the locking mechanism is disabled. With the lever held up the seat is then fully loaded again whereby it moves down to the desired level, at which the lever is released. At this moment the locking mechanism is reactivated, thereby locking the seat at the desired height.

Figure 3:
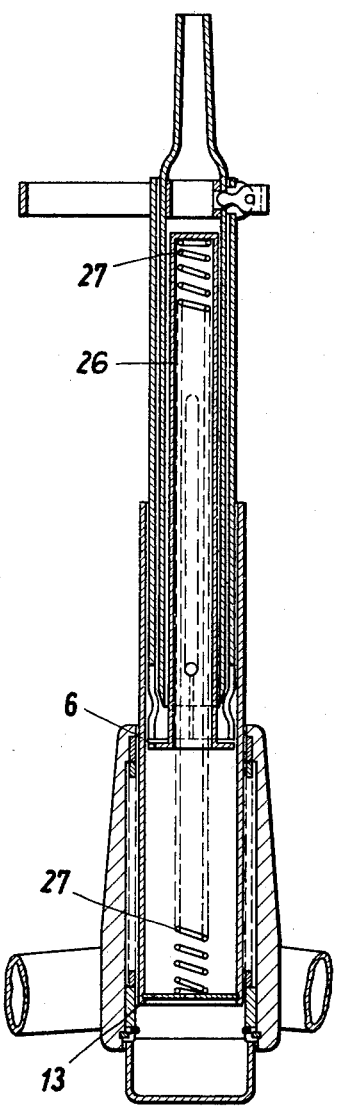
FIGURE 3 is a cross-section through a column similar to that of FIG. 1 but with built-in helical lifting spring.

As shown in FIG. 3, the same effect can be also attained by means of a simple helical compression spring 27 which at its lower and upper ends respectively bears against a supporting element 13 and plate 6, which in this case has the form of a shell 26. The lowering and lifting operations in this embodiment correspond to those of the column with built-in pneumatic spring as described.

To prevent the seat with mounting tube 1 and slide tube 2 from being inadvertently lifted off, a threaded pin 20 is provided which is secured to mounting tube 1. If a pneumatic spring is used, the front end of the threaded pin engages a groove in the upper end of the spring. If no lifting spring is employed, the lock to prevent the seat from being lifted off comprises a lock pin 24 which is provided on supporting tube 3 and is in engagement with a slot 25 in slide tube 2, as is well known.

It should be understood that various changes may be made in the above constructions without departing from the scope of the invention. Thus, the column could be turned over for use with a chair, for example, in which case lever 19 would be located near the floor so that it could be actuated by foot. Such an arrangement would involve only minor changes without affecting the principle of the invention.

What is claimed as new and desired to secure by Letters Patent is:

1. A vertically adjustable column, particularly for swivel chairs, comprising a sleeve-like base member (10) with pedestals, a tubular supporting member (3) and a tubular slide member (2), said tubular supporting member being resiliently supported within said sleeve-like base members, said tubular slide member having its lower end portion slidably situated in said tubular supporting member, the lower end portion of said tubular slide member having elongated slots (2a) and radially inwardly protruding indentations (2b) situated in the walls thereof between said slots, a tubular mounting member (1) having a tapered end portion (1b) and being slidably fitted into the tubular slide member, said tapered end portion, upon sliding movement of member (1) in one direction, pressing progressively against the inwardly protruding indentations (2b) and thereby forcing the portions of the tubular slide member into frictional locking engagement with the tubular supporting member and, upon sliding movement of member (1) in the opposite direction, retreating progressively from the indentations (2b), and a tilting lever (19) pivotably secured to the upper end of said tubular slide member (2), said slide member (2) having an aperture in its upper end, said tubular mounting member (1) having an aperture, said lever extending freely through the aperture in said slide member into engagement with the aperture in said mounting member.

2. The column as claimed in claim 1, further comprising pneumatic spring (5) fitted into the interior of said tubular supporting, slide and mounting members, and operatively connected with said tubular supporting and slide members.

3. The column as claimed in claim 1, further comprising a helical compression spring (27) fitted into the interior of said tubular supporting, slide and mounting members and operatively connected with said tubular supporting and slide members.

4. The column as claimed in claim 1, wherein the lever (19) has a bent-around nose portion (19a) as its part in engagement with the aperture in said mounting member, said nose portion extending in the same direction of swing as said lever (19).

5. The column as claimed in claim 4, further comprising a bearing pin (21) supported on the slide member (2) and a spring element (23), and wherein the lever comprises two portions (19, 19b) pivoted about said bearing pin (21), said spring element connected between the two portions (19, 19b) and biasing them toward contact with each other, transmittal of force through the lever to move member (1) in said opposite direction being via spring element (23).

References Cited

UNITED STATES PATENTS

| | | | |
|---|---|---|---|
| 619,596 | 2/1899 | Mayor | 248—412 XR |
| 3,148,854 | 9/1964 | Junkunc | 108—148 XR |
| 3,201,079 | 8/1965 | Doetsch | 248—412 |
| 3,191,902 | 6/1965 | Goller | 248—188.5 |

FRANCIS K. ZUGEL, Primary Examiner

U.S. Cl. X.R.

108—148